United States Patent [19]
Zaima et al.

[11] Patent Number: 5,134,014
[45] Date of Patent: Jul. 28, 1992

[54] MOLDABLE FOAM COMPOSITE

[75] Inventors: Harold H. Zaima, Birmingham; J. Christopher Landry, Lake Orion, both of Mich.

[73] Assignee: Eften, Inc., Farmington Hills, Mich.

[21] Appl. No.: 646,704

[22] Filed: Jan. 28, 1991

[51] Int. Cl.⁵ .......................... B32B 29/08; B32B 3/26
[52] U.S. Cl. .................................... 428/186; 428/198; 428/317.1; 428/317.7; 428/318.4; 264/321
[58] Field of Search ................. 264/321; 428/186, 198, 428/317.1, 317.7, 318.4

[56] References Cited

U.S. PATENT DOCUMENTS

| | | | |
|---|---|---|---|
| 4,131,702 | 12/1978 | Alfter et al. | 428/311.7 |
| 4,262,050 | 4/1981 | Jenkins | 428/186 |
| 4,877,671 | 10/1989 | Stagg et al. | 428/186 |
| 4,886,696 | 12/1989 | Bainbridge | 428/186 |

FOREIGN PATENT DOCUMENTS 3417792  11/1985  Fed. Rep. of Germany ... 428/316.6

Primary Examiner—William J. Van Balen
Attorney, Agent, or Firm—Notaro & Michalos

[57] ABSTRACT

A heat moldable composite panel is particularly useful as an automotive headliner and other as structural parts which must have heat and sound insulating properties as well as sound absorbing properties. The panel comprises a corrugated core which is advantageously dual arched core or corrugated metal foil, with opposite sides. One side is covered by a linerboard and is attached to the core through thermoplastic adhesive. The opposite side is covered by a thermoformable foam layer which is attached to the core by heat activatable adhesive. The entire structure is formable in a molding die at relatively low temperatures.

19 Claims, 2 Drawing Sheets

MOLDABLE FOAM COMPOSITE

FIELD AND BACKGROUND OF THE INVENTION

The present invention relates in general to composite sandwich structures, and in particular to a new and useful thermoformable composite construction in which a corrugated core is bonded to a linerboard with a thermoplastic on one side, and to a moldable foam on the other side. The invention also includes a method of constructing the composite.

Composite board sandwich structures with parallel liners and at least one corrugated paper medium have a wide variety of applications. Such elements may be used, for example, as light weight, interior linings for walls, floors and ceiling panels, as facings, trims and headliners of automotive vehicles and for other applications where heat insulation, sound insulation and absorption and/or dampening of mechanical vibration are required. See, for example, U.S. Pat. Nos. 4,150,186, 4,170,674, and 4,933,225. The corrugated paper core in such prior art structures are typically adhered to opposite covering linerboards with an adhesive agent.

U.S. Pat. No. 3,867,240 discloses a composite panel for the headliner and other trim in an automobile, which includes a layer of rigid resin foam core. The core is sandwiched between paper linerboards for protecting the core. No corrugated layer is provided in this composite structure.

As recognized in the above-identified patents, insulation from heat and sound is almost indispensable. This is particularly true in the rooms of buildings, the cabins of ships, the interiors of automobile and some furniture applications.

Both in buildings and automobiles, a predominant method is to line the exterior structure with some type of insulating member. These members are normally attached to walls, floors and ceilings of buildings and automobiles. In some cases, however, the surfaces are not flat. This necessitates the insulating material to be shaped to the shape of the structure to be insulated. In addition to insulation, noise absorption may become critical in many building and automobile applications. When noise abatement is not sufficient to prevent infiltration of all unwanted noise, then noise absorption is required in order to attenuate the unwanted noise that would penetrate into the insulated space. It is important to accomplish this in an inexpensive manner and with as low a specific gravity as possible. U.S. Pat. No. 4,184,905 describes a heat and sound insulator of curved corrugated paperboard and method of shaping the structure, but it does not address the noise absorption problem.

In addition, rigidity may be necessitated when the insulator for building purposes is self-supported and more importantly if the material is used as a structural membrane for the interior of an automobile.

Noise absorbent materials are known which utilize fiberglass and resinated cotton. The use of fiberglass reinforced foam is also known.

Noise absorbent materials made of fiberglass and resinated cotton (shoddy) are impregnated with phenolic resins which require high temperatures of 200°–240° C. in order for the resins to cure. This high temperature precludes the molding and laminating, in a single step, of heat sensitive covering materials such as foam, foam backed cloth or vinyl to the fiberglass and resinated cotton structure. These decorative materials tend to burn or scorch when subjected to high temperatures. It would be advantageous to use moldable or formable foam, however, since it is much lighter than both resinated cotton and fiberglass. Also moldable foams form at lower temperatures allowing the covering material to be laminated while the substrate is being molded in one step.

Moldable or formable foams, resinated cotton and fiberglass have an advantage over linerboard plus corrugated core structures which are illustrated in the above-identified patents, in that they permit a deep draw when molded. Paper products using corrugated cores usually permit an elongation in the cross direction of only 5% and in the machine direction of only 2.5%. Due to these restrictions, it is difficult to achieve deep draws and/or contours. As a solution, resinated cotton or fiberglass may be used as a covering. The molding temperature again becomes a problem however.

Another requirement, in particular for automotive headliners, is flexibility. Automobile manufacturing currently requires that headliner substrates be foldable in order to facilitate their installation and serviceability. The headliner, for example, must be folded so that it can be introduced through available openings in the automobile body, for placement of the headliner against the ceiling of the automobile. The headliner must also be bendable to service various components that may be attached to the back section of the headliner.

The currently available headliners which include corrugated or other shaped core layers, are not restored to their original shape once they are folded. A visible crease remains in the structure.

SUMMARY OF THE INVENTION

The present invention comprises a moldable composite panel and method of manufacturing the panel. The panel comprises a corrugated core having opposite first and second sides. A linerboard is adhered to the first side of the core by a heat activated adhesive, in particular, thermoplastic, and a foam layer is adhered to the second side of the core, also by a heat activated adhesive.

The panel of the invention may thus be formed into any desired shape at relatively low temperatures (120°–140° C.). Low temperature molding allows the panel to be constructed in a single step. Other heat sensitive laminates may also be connected to the panel during the same single molding step, such as a covering material. By using a single faced corrugated product and a foam composite, the panel is flexible yet has structural integrity and is self-supporting. It can also achieve deep draws. In extreme cases, the single face linerboard may actually tear, with the foam covering the gap thus formed and providing a uniform cosmetic covering with good appearance.

The flexible characteristics of the foam also permit any structure, such as an automotive headliner constructed with the panel, to be folded. Any crease which is created within the single facer corrugated part of the panel, is again covered by the flexible foam.

The use of foam adds noise absorption characteristics to the panel which are not available in prior panels utilizing a double facer corrugated core product.

It is important to distinguish between noise absorbing properties and noise insulating properties. Noise absorbing properties are those which permit sound in an enclosure, for example, noise within the cabin of an automobile, to be absorbed rather than reflected. This reduces the level of sound within the enclosure. The noise may have entered the enclosure from outside or originated in the enclosure. A noise insulating effect blocks sound from outside before it penetrates into the enclosure. A noise insulating material does not necessarily absorb noise and does not necessarily reduce the amount of noise within an enclosure, once the noise has entered the enclosure. The present invention has the advantage of being both noise absorbing and noise insulating.

In addition, for the purpose of this disclosure, the terms "moldable" and "molded", when applied to the foam, imply the fact that the foam can be formed into a particular shape and this shape is retained not because of the structural self-supporting nature of the foam itself, but because it is adhered to the single faced corrugated linerboard which, itself, is self-supporting and retains the shape into which it was molded.

By eliminating one of the linerboards, and replacing it with a foam layer, it has been found that a normal (single ply) corrugated medium is not rigid enough to withstand the compression strength of the foam during the molding operation. Normal corrugated medium crushes at approximately 2.0 kg/cm$^2$. This pressure is often exceeded when molding the single facer corrugated medium with foam in the mold.

Sufficient rigidity to ensure that the panel is self-supporting and dimensional stable, are required however.

To achieved this, a corrugated core having two types of flutes is used according to the present invention. One is a dual arch corrugated medium utilizing two paperboard layers which are adhered to each other. The second major type is an aluminum or other metal foil corrugated medium. A hybrid type of corrugated medium may also be utilized which includes one paperboard layer adhered to one metal foil layer (e.g. aluminum). Instead of the foregoing alternate arrangements for stiffening the corrugated medium, another approach is to provide corrugated medium made of heavier paper which has a greater flat crush strength, the flat crush strength being an industry recognized characteristic for corrugated medium.

These approaches provide the composite of the present invention with sufficient rigidity to withstand the forces of the compressing foam in the mold.

The use of dual arch or aluminum corrugated medium also provides the required dimensional stability.

Accordingly, an object of the present invention is to provide a moldable panel which has heat and sound insulating properties as well as noise absorbing properties.

A further object of the present invention is to provide a method of shaping a heat and sound insulating plate member that also provides noise absorption and which is shaped to have the desired curved contours of the structure to be insulated, while having the composite maintain its exact shape indefinitely.

It is also an object of the present invention to provide a composite material that has sufficient structural rigidity to become, when required, a structural membrane.

It is a further object of the present invention to provide a composite that has superior shaping characteristics without imperfections and to accommodate deep draw contours which are often required for various applications.

According to the invention, heat and sound insulation as well as a structural noise absorption plane plate member comprise a corrugated medium made from a dual arch or an aluminum medium, a sheet liner of paper arranged to cover one side of the corrugated medium, a layer of thermoplastic resin between the corrugated medium and the liner such that the corrugated medium is joined at respective top regions of its parallel ridges with the inside surface of the liner with the resin layer sandwiched therebetween, and a moldable foam on the opposing side of the corrugated medium with a layer of heat activated resin adhering the moldable foam to the top regions of the corrugated medium.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
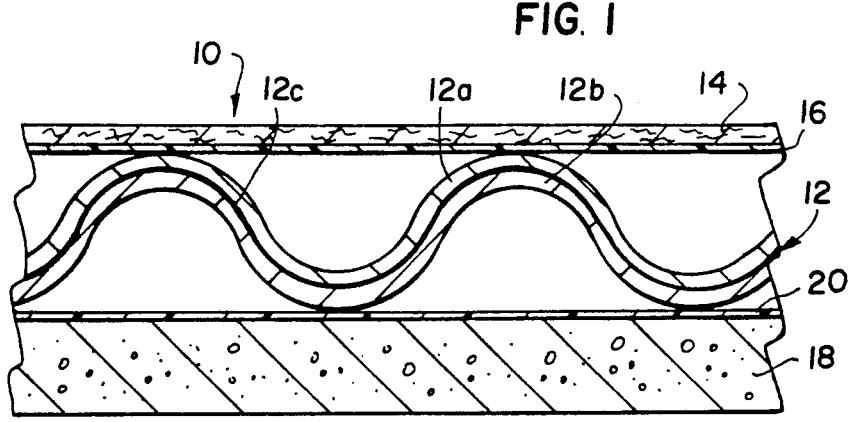
FIG. 1 is a greatly enlarged sectional view taken through a portion of a moldable composite panel constructed in accordance with the present invention and before it is formed into a final shape.

Referring to the drawings in particular, the invention embodied in FIG. 1 comprises a moldable composite generally designated 10 having a corrugated core layer 12 with an upper first surface and a lower second surface, formed by respective upper and lower arches of successive corrugations in the layer. The first side of core 12 is covered by a paper linerboard which is connected to the upwardly curved arches of the corrugated core, by a heat activated thermoplastic layer 16. Linerboard 14 may be pre-connected to core layer 12 before the molding operation or may be loose.

The second side of corrugated core 12 is covered by a foam layer 18 and is connectible to the lower surface of the arches of the core by a heat activated adhesive 20.

Figure 2:
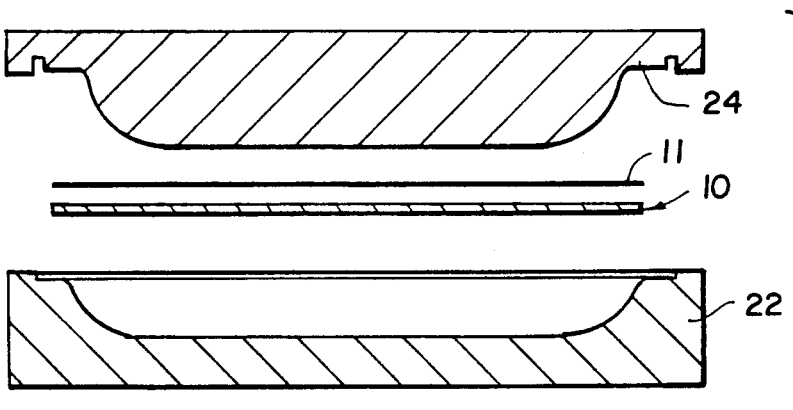
FIG. 2 is an exploded sectional view of the panel which is about to be molded by pressure and heat in a mold.

Once constructed, panel 10, in a planar flat condition, may be placed between the dies 22 and 24 of a mold shown in FIG. 2. The molding dies are heated and pressed against each other so that panel 10 is thermally formed into a non-planar shape having curves in multiple directions. A decorative covering 11 may be included in the molding dies and connected to the foam side of the panel during the molding step. Covering 11 may be foam backed cloth or any other covering such as those mentioned above.

During the molding operation, thermoplastic layer 16, which is of the readily reheatable type, softens to allow relative slippage between the linerboard 14 and the first side of corrugated core 12. This is true whether the linerboard was pre-connected to the core or not.

Figure 5:
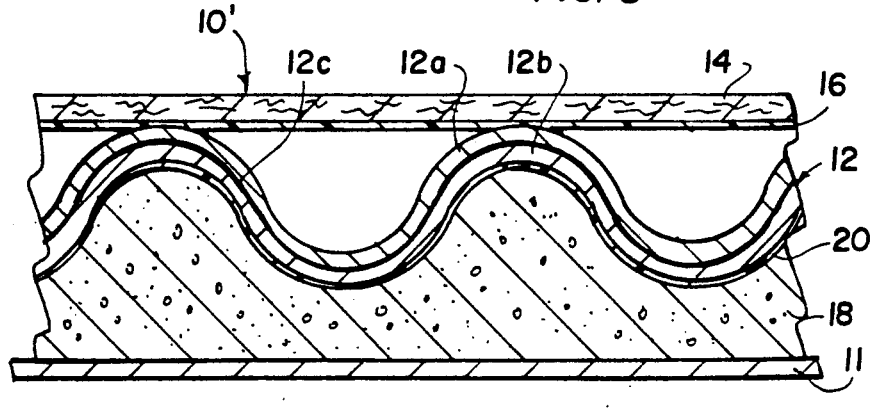
FIG. 5 is a view similar to FIG. 1 showing the layers after they have been subjected to the molding operation.

During the molding operation, foam layer 18 is pressed into and adhered with the second surface of the corrugated core by heat activation of the adhesive 20 as shown in FIG. 5 which illustrated the molded or formed panel 10'.

In one embodiment of the invention, adhesive 20 may also be of the thermoplastic type.

To prevent crushing of the corrugated core 12 during the molding operation, it has been found advantageous to construct core 12 of dual arch corrugated material or of metal foil, in particular aluminum foil. Dual arch corrugated medium comprises two layers of material 12a and 12b which are connected to each other by an adhesive 12c. Either one or both of the layers may be paperboard. In one embodiment of the invention, one layer is metal foil (e.g. aluminum) and the other is paperboard. One layer of metal foil or one layer of heavier weight paper corrugated core may also be used.

Figure 3:
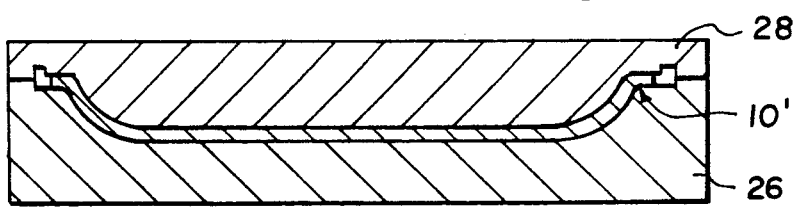
FIG. 3 is a sectional view of the molded panel supported in a shape-retaining jig, for cooling.

To avoid unintentional deformation of the formed panel after it is released from the mold 22, 24 and before its thermoplastic portions have cooled and hardened, the formed panel 10' shown in FIG. 3 may be supported in a jig 26, until the panel has cooled and hardened. Jig 26 may have a cover 28. The use of a separate jig as shown in FIG. 3 is not essential.

Figure 4:
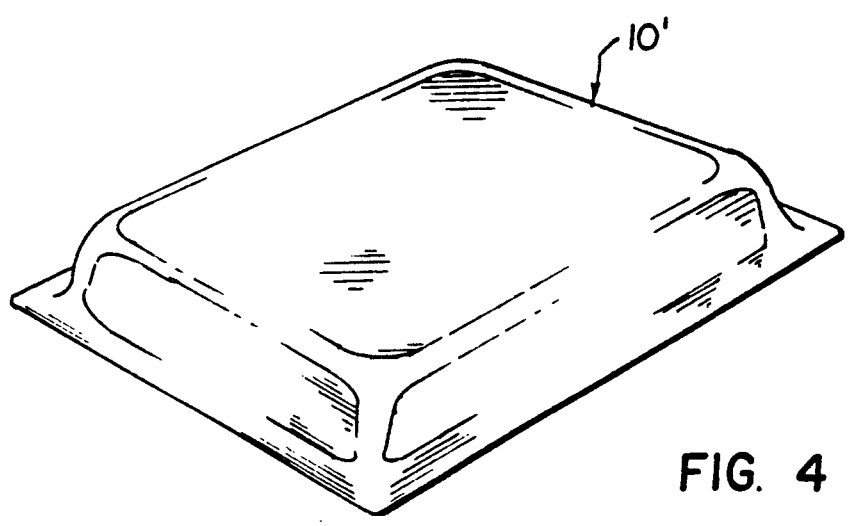
FIG. 4 is a perspective view of a molded headliner for an automobile constructed with the panel of the present invention.

FIG. 4 is a perspective view of the formed panel 10' in its final shape for use as an automobile headliner.

An example of the method for constructing the panel of the present invention follows.

A sheet of foam material, for example, polyurethane foam material, is extremely flexible and has no self-supporting strength. To provide the material with some self-supporting strength and rigidity so that it can be conveniently engaged with the single facer corrugated element or corrugated core 12 plus linerboard 14, the sheet of foam material having, for example, isocyanate hardener and adhesive thereon is cast into a flat panel. This stiffens the sheet of foam so that it can be handled more easily and so that it is not excessively crushed within mold 22, 24 during the forming process.

One preferred example of the moldable foam 18, as noted above, is polyurethane foam. Polyurethane foam has isocyanate and a urethane adhesive.

Alternatively, thermoformable polyurethane foams which are commercially available and known to persons having skill in this art, can be formed by a discontinuous or continuous slab stock technique wherein the pre-expanded foam mixture is either poured into a form or poured onto a moving conveyor belt, and allowed to expand and harden against a resistance (such as a floating lid on the form or confining conveyor belts over the moving belt) to yield a final slab-like rigid product. An isocyanate and polyurethane mixture may also be foamed into a bun and then sliced into panels.

Suitable foam products are available from Johnson Control Inc. (JCI) from Bayer-Mobay, from BASF and from Recticel.

A product available from Bayer-Mobay, for example is referred to by the commercial name BAYNAT and is a low-density isocyanate-based rigid polyurethane which is tough in resistant and can be thermoformed. Flexible foams such as the product referred to by the commercial name MOLTOBREN are also available from Bayer-Mobay, and may also be utilized if stiffened as noted above.

JCI urethane foams have been particularly effective in practicing the present invention.

One example of the heat activated adhesive 20 which is used to attached the moldable polyurethane foam layer 18 to the moldable core 12, is a reheatable thermoplastic made of polyethylene and produced, for example, by Dow Chemical. Foamlike styrene maleic anhydride or other styrene based products may also be used.

The thermoplastic layer 16 for attaching the linerboard 14 to the core 12 is also heat activated and reheatable type. Here low density polyethylene may be utilized. Other thermoplastics such as medium density polyethylene (PE) and high density PE may also be used as well as various by-laminates of PE or other polyolefins, polyamides, mixtures of ethyl, vinyl, acetate and polyolefins.

One example of the dual arch corrugated medium for core 12 is two layers of number 10 kraft paper connected to each other usually by starch or some other adhesive like PE thermoplastic. An example of the hybrid core is a layer of number 10 kraft paper adhered by PE to 0.0007 inch thick aluminum. Aluminum is available in gauge sizes of 0.00028 inches, 0.00035 inches, 0.0005 inches and 0.0007 inches. When using corrugating aluminum, gauges less than 0.0007, would tear. In combination with kraft paper however, a reduced thickness of aluminum would be usable.

Where core 12 is corrugated aluminum alone, at least a 0.0007 inch thickness should be used.

The forming process can be similar to that disclosed in U.S. Pat. No. 4,184,905. For example, panel 10 is first introduced into the molding die of FIG. 2 and the press is closed. This step lasts approximately 30 seconds. Next, the press is opened and a covering material (not shown) may be introduced into the molding die to cover the molded substrate. This for example, may be decorative fabric or other surface material. The molding die is then closed once more and remains closed for approximately 15 seconds.

With the time it takes for the press to move up and down (approximately 5 seconds per stroke), the total cycle time is 1 minute.

Another method of forming the panel has the same initial 30 second step of the method described above. Following this, the molded substrate is moved into the cooling jig or fixture of FIG. 3 which includes the cover 28 for closing the jig and accelerating the cooling operation.

Another method is the same as the first method but everything including the covering material is placed into die and molded in one step. The covering material is also against the foam layer, using heat activated adhesive for connection to the foam.

Before cover 28 of the jig is closed however, the covering material (not shown) may be placed onto the hot substrate 10'. The heat from the substrate activates adhesive on the covering material causing the covering material to bond to the substrate 10' when the fixture is closed.

The time to transfer the part from the molding die to the cooling fixture is about 10 seconds so that this method can be completed in a 40 second cycle time. This represents a 20 second improvement over the earlier process. Immediately after the molded substrate 10' is transferred from the molding dies, a new substrate can be placed in the molding dies to further accelerate mass production.

While a specific embodiment of the invention has been shown and described in detail to illustrate the application of the principles of the invention, it will be understood that the invention may be embodied otherwise without departing from such principles.

WHAT IS CLAIMED IS:

1. A moldable composite panel for use as an automotive headliner and the like, comprising:
   a corrugated core having first and second opposite sides;
   a linerboard adhered to the first side of the core by a thermoplastic; and
   a thermoformable foam layer adhered to the second side of the core by a heat activatable adhesive.

2. A panel according to claim 1, wherein the foam layer is directly adhered to the second side of the core.

3. A panel according to claim 1, wherein the core comprises a dual arch core made of at least two layers of material, at least one layer of material of the core being paperboard.

4. A panel according to claim 3, wherein at least one layer of the material of the core is metal foil.

5. A panel according to claim 3, wherein both layers of material of the core are paperboard which are adhered to each other with adhesive.

6. A panel according to claim 1, wherein the corrugated core is made of metal foil.

7. A panel according to claim 6, wherein the metal foil is aluminum.

8. A panel according to claim 7, wherein the aluminum has a thickness of approximately 0.0007 inches.

9. A panel according to claim 1, wherein the heat activatable adhesive is thermoplastic.

10. A panel according to claim 1, wherein the foam layer comprises polyurethane foam and is directly connected by the adhesive to the second side of the core, the corrugated core comprising dual arch core.

11. A panel according to claim 1, wherein the foam layer comprises polyurethane foam and is directly connected by the adhesive to the second layer of the core, the corrugated core comprising corrugated metal foil.

12. A method of constructing a thermoformable composite panel for use as automotive headliners and the like, comprising:
   positioning a panel in a molding die, the panel comprising a corrugated core having opposite sides, one side covered by a linerboard with a thermoplastic between the linerboard and the core, and the opposite side covered by a thermoformable foam layer with a heat activatable adhesive between the foam layer and the core;
   closing the mold die to heat and shape the panel into a shaped panel; and
   opening the die to release the shaped panel.

13. A method according to claim 12, including connecting the linerboard to the core through the thermoplastic before the panel is placed in the die.

14. A method according to claim 13, wherein the foam layer is not attached to the core through the heat activatable adhesive until after the molding die is closed.

15. A method according to claim 12, wherein the corrugated core is made of dual arch corrugated medium.

16. A method according to claim 15, wherein the dual arch corrugated medium has at least one paperboard layer.

17. A method according to claim 16, wherein the dual arch corrugated has at least one metal foil layer.

18. A method according to claim 12, wherein the corrugated medium is made of corrugated metal foil.

19. A method according to claim 18, wherein the metal foil is aluminum.

* * * * *